(12) United States Patent
van der Meulen et al.

(10) Patent No.: US 8,933,190 B2
(45) Date of Patent: Jan. 13, 2015

(54) PROCESS FOR PREPARING A POLYESTER

(75) Inventors: Inge van der Meulen, Eindhoven (NL); Saskia Huijser, Eindhoven (NL); Erik Gubbels, Eindhoven (NL); Andreas Heise, Eindhoven (NL); Robert Duchateau, Eindhoven (NL); Cornelis Erne Koning, Eindhoven (NL)

(73) Assignee: Saudi Basic Industries Corporation, Riyadh (SA)

( * ) Notice: Subject to any disclaimer, the term of this patent is extended or adjusted under 35 U.S.C. 154(b) by 20 days.

(21) Appl. No.: 13/297,344

(22) Filed: Nov. 16, 2011

(65) Prior Publication Data

US 2012/0136134 A1     May 31, 2012

Related U.S. Application Data

(60) Provisional application No. 61/415,020, filed on Nov. 18, 2010.

(30) Foreign Application Priority Data

Nov. 18, 2010   (EP) ..................................... 10014743

(51) Int. Cl.
    *C08G 63/84*       (2006.01)
    *C08G 63/82*       (2006.01)
    *C08G 63/00*       (2006.01)
    *C08G 63/78*       (2006.01)

(52) U.S. Cl.
    CPC .............. *C08G 63/823* (2013.01); *C08G 63/00* (2013.01); *C08G 63/78* (2013.01)
    USPC ........... 528/354; 528/357; 528/361; 534/701; 534/707; 534/713; 546/323; 548/156

(58) Field of Classification Search
    USPC .................. 528/354, 357; 534/701, 707, 713; 546/323; 548/156
    See application file for complete search history.

(56) References Cited

U.S. PATENT DOCUMENTS

2009/0124787 A1    5/2009   Preishuber-Pflugl et al.
2009/0227762 A1*   9/2009   Blackburn et al. ............ 528/354

FOREIGN PATENT DOCUMENTS

| JP | 2003-064174 | * | 3/2003 |
|---|---|---|---|
| JP | 2003064174 | A | 3/2003 |
| WO | 9628402 | | 9/1996 |
| WO | 2004081020 | A1 | 9/2004 |
| WO | 2006108829 | A2 | 10/2006 |
| WO | 2010110460 | A1 | 9/2010 |

OTHER PUBLICATIONS

Japanese Patent No. 2003064174 (A); Publication Date: Mar. 5, 2003; Abstract Only; 1 Page.

International Publication No. 2010110460 (A); Publication Date: Sep. 30, 2010; Abstract Only; 1 Page.
European Search Report; European Application No. 10014745.3; Mailing date: Jun. 17, 2011; 5 Pages.
w-Pentadecalactone Polymerization and w-Pentadecalactonele-Caprolactone Copolymerization Reactions Using Organic Catalysts. Bouyahyi, M.; Pepels, M. P. F.; Heise, A.; Duchateau, R. Macromolecules 2012, 45, 3356-3366.
Ring-Opening Polymerisation of Substituted e-Caprolactones with a chiral (Salen) AlOiPr Complex, Ten Breteler et al, Journal of Polymer Science: Part A: polymer Chemistry, vol. 45, 429-436 (2007).
Pendant arm Schiff base complexes of aluminum as ethylene polymerization catalysts Cameron, P. A.; Gibson, V. C.; Redshaw, C.; Segal, J. A.; Bruce, M. D.; White, A. J. P.; Williams, D. J. Chem. Commun. 1999, 18, 1883-1884.
Synthesis and characterization of neutral and cationic alkyl aluminum complexes bearing N,O-Schiff base chelates with pendant donor arms. Cameron, P. A.; Gibson, V. C.; Redshaw, C.; Segal, J. A.; White, A. J. P.; Williams, D. J. J. Chem. Soc., Dalton Trans. 2002, 3, 415-422.

(Continued)

*Primary Examiner* — Gregory Listvoyb
(74) *Attorney, Agent, or Firm* — Cantor Colburn LLP

(57) ABSTRACT

Disclosed is a process for preparing a polyester or copolymer containing ester functionalities. The process can comprise:

providing an optionally substituted lactone having a ring size of from 6 to 40 carbon atoms; and subjecting said lactone to metal mediated ring-opening polymerization using as catalyst a compound according to general formula (I):

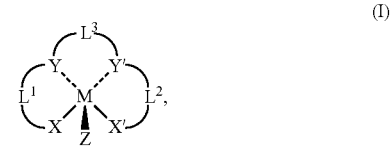

(I)

wherein

M can be Al, Cr, Mn and Co;

X and X' are independently a heteroatom;

Y and Y' can be, independently, selected from O, N, S, P, C, Si, and B;

Z can be selected from hydrogen, borohydrides, aluminum hydrides, carbyls, silyls, hydroxide, alkoxides, aryloxides, carboxylates, carbonates, carbamates, amidos, thiolates, phosphides, and halides;

$L^1$ and $L^2$ can be independently an organic ligand linking X and Y together and linking X' and Y' together, respectively; and $L^3$ is an optional organic ligand linking Y and Y' together.

20 Claims, 1 Drawing Sheet

(56) References Cited

OTHER PUBLICATIONS

Ring-Opening Polymerization of Lactides Initiated by Zinc Alkoxides Derived from NNO-Tridentate Ligands. Chen, Hsuan-Ying; Tang, Hui-Yi; Lin, Chu-Chieh Macromolecules 2006, 39, 3745-3752.

Ring-opening polymerization of cyclic monomers by biocompatible metal complexes. production of poly(lactide), polycarbonates, and their copolymers. Darensbourg, D. J.; Choi, W.; Richers, C. P. Macromolecules 2007, 40, 3521-3523.

Factors affecting aluminum-carbon bond reactivity of tetradentate Schiff-base organoaluminum complexes. Dzugan, S. J.; Goedken, V. L. Inorg. Chem. 1986, 25, 2858-2864.

Study of ligand substituent effects on the rate and stereoselectivity of lactide polymerization using aluminum salen-type initiators. Hormnirun, P.; Marshall, E. L.; Gibson, V. C.; Pugh, R. I.; White, A. J. P. P. Natl. Acad. Sci. USA 2006, 103, 15343-8.

Synthesis of High Molecular Weight Polyesters via in Vacuo Dehydrogenation Polymerization of Diols. Hunsicker, D. M.; Dauphinais, B. C.; Mc Ilrath, S. P.; Robertson, N. J. Macromol. Rapid Commun. 2012, 33, 232-236.

Zinc complexes of a new N,N,O ligand. Troesch, A.; Vahrenkamp, H. Z. Anorg. Allg. Chem 2004, 630, 2031-2034. English Abstract Only (first page).

Conformationally Flexible Dimeric Salphen Complexes for Bifunctional Catalysis, Sergei I. Vagin et al, J. Am. Chem. Soc. 2010, 132, 14367-14369.

Catalytic Ring-Opening Polymerization of renewable Macrolactones to High Molecular Weight Polyethylene-like Polymers. van der Meulen, I.; Gubbels, E.; Huijser, S.; Sablong, R.; Heise, A.; Koning, C. E.; Duchateau, R. Macromolecules 2011, 44, 4301-4305.

Borgne et al.; "Ring-Opening Oligomerization Reactions Using Aluminum Complexes of Schiff's Bases as Initiators", Makromol. Chem.; Macromol. Symp.; 73; pp. 37-46; 1993.

International Search Report for International Application No. PCT/EP2011/005722; International Filing Date: Nov. 14, 2011; Date of Mailing: Mar. 16, 2012; 4 pages.

Written Opinion of the International Search Report for International Application No. PCT/EP2011/005722; International Filing Date: Nov. 14, 2011; Date of Mailing: Mar. 16, 2012; 5 pages.

\* cited by examiner

Scheme 1
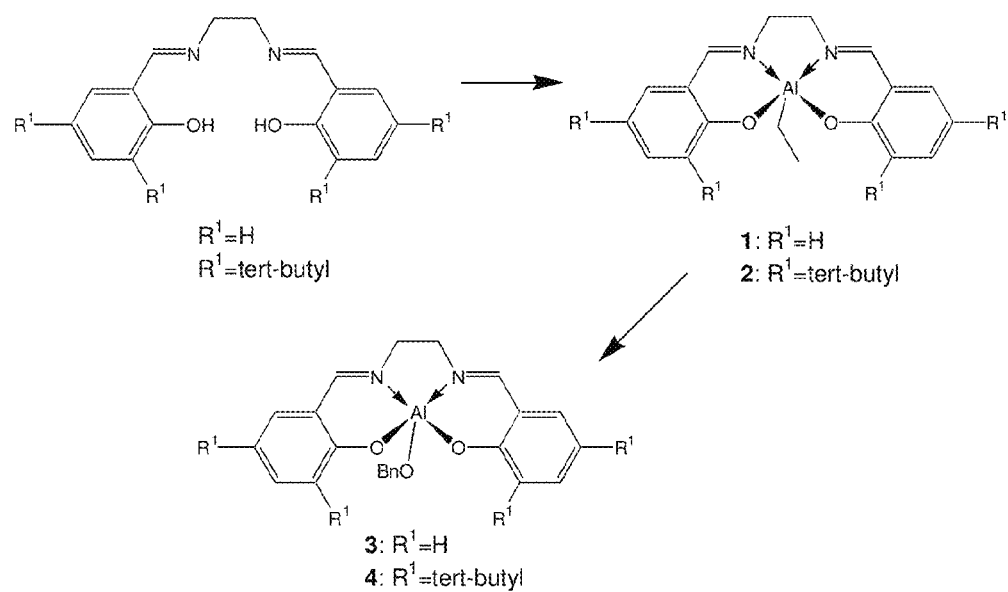
Figure 1
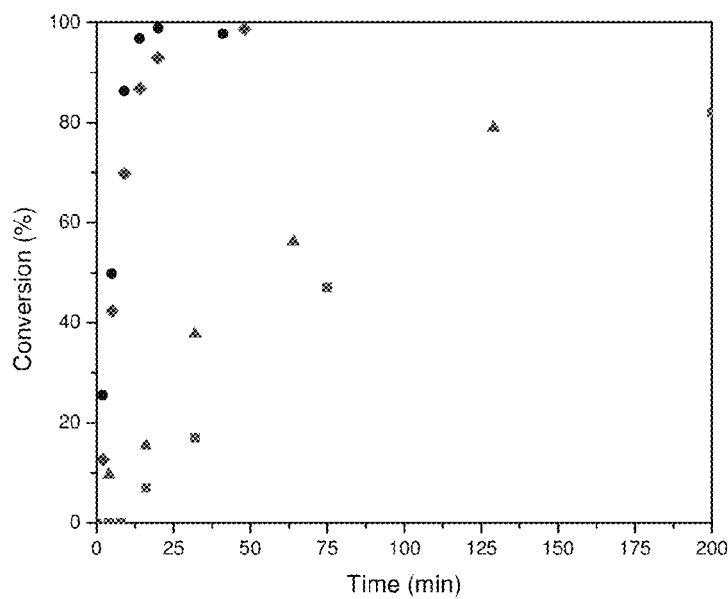

PROCESS FOR PREPARING A POLYESTER

CROSS REFERENCE TO RELATED APPLICATIONS

This application is a non-provisional of U.S. Application Ser. No. 61/415,020, filed Nov. 18, 2010 and also claims priority to European Patent Application No. 10014743.8, filed Nov. 18, 2010, both of which are incorporated herein by reference.

TECHNICAL FIELD

The invention is directed to a process for preparing a polyester or copolymer containing ester functionalities, and more in particular to a process for preparing a polyester or copolymer containing ester functionalities using metal mediated ring-opening polymerization, and even more in particular metal mediated ring-opening polymerization of so-called macrolactones.

BACKGROUND

Polyesters are very interesting materials because of the properties that these materials can exhibit. These properties, for instance, include biocompatibility, biodegradability and drug permeability. Therefore, polyesters are of great interest for medical and food packaging applications. For these purposes materials with an engineered structure are desired, which implies the need for a high level of control over the polymerization reaction. In addition, with the right properties, polyesters can form an interesting biodegradable alternative for polyethylene in many applications. Traditional polyester synthesis strategies, using e.g. polycondensation, give rise to fundamental problems that can make the controlled synthesis of these materials a tedious process. For example, the preparation of polyesters by polycondensation can be accompanied by stoichiometric problems, the need for high conversion and the removal of small molecules formed during the reaction.

A suitable replacement for these conventional strategies is the ring-opening polymerization of lactones. This polymerization is based on the fact that cyclic monomers "open up" and form a polymer chain by means of a chain-growth process. However, ring-opening polymerization reactions can also be difficult to control, in particular when anionic or cationic initiators are used.

It is known that ring-opening polymerization reactions can be performed with enzymes with satisfactory conversion under mild polymerization conditions. For example, lipases such as Candida Antarctica Lipase B (CALB) are highly active in the ring-opening polymerization of lactones and show exceptionally high polymerization rates for macrolactones. The reactivity of lactones in this process is not governed by the high ring-strain of small lactones (cisoid ester bonds) but by the preference of the lipase for transoid ester bond conformation present in large ring lactones. Macrolactones can thus easily be polymerized by CALB. For example, poly(pentadecalactone) with a number average molecular weight up to 150 000 g/mol have been reported (Focarete et al., J. Polym. Sci. B: Polym. Phys. 2001, 39, 1721 and De Geus et al., Polym. Chem. 2010, 1, 525).

However, control over molecular weight and polydispersity index (in particular a polydispersity index of ≥2) of the resulting polyester is limited. Moreover, ring-opening polymerization with enzymes is strongly limited by the applied temperature, because enzymes will typically not withstand higher reaction temperatures. In addition, the enzymes that can be used for ring-opening polymerization of lactones are rather expensive.

In view of the limitations of enzymatic ring-opening polymerization, attempts have been made to find suitable alternative metal-mediated ring-opening polymerization processes. Such processes are particularly attractive, because they allow a high level of control over the polymer molecular weight, the molecular weight distribution, copolymer composition and topology and end-groups by using a nucleophilic initiator. It is commonly agreed that the driving force behind the ring-opening polymerization of lactones is the release of ring-strain in the transition from the cyclic ester to the polyester chain or, in thermodynamic terms, by the negative change of enthalpy. Consequently, as the ring-strain decreases with increasing lactone size so does the reactivity in metal-mediated ring-opening polymerization. Experimentally, this was shown by Duda in a comparative study of the ring-opening polymerization of various size lactones using zinc octoate/butyl alcohol as a catalyst/initiator (Duda et al., Macromolecules 2002, 35, 4266). While the relative rates of polymerization were found to be 2500 and 330 for the six-membered (δ-valerolactone) and seven-membered (ε-caprolactone) lactones, respectively, the reaction rates of the 12-17 membered lactones were only around 1. Consequently, only a few examples of metal-catalyzed ring-opening polymerization of macrolactones like 15-pentadecalactone can be found in literature, while those examples that can be found only report low yields and low molecular weights. The best results were obtained using yttrium tris(isopropoxide) leading to acceptable conversions and molecular weights of up to an absolute number average molecular weight of 30 000 g/mol (Zhong et al., Macromol. Chem. Phys. 2000, 201, 1329).

WO 2006/108829 relates to a method for producing polyhydroxyalkanoates by the polymerisation of lactones in the presence of at least one catalyst of formula $L_1M^aX^a_m$.

JP 2001/0255190 discloses a lactone ring-opening polymerization catalyst which can simply produce stereocomplexes having sufficiently high thermal stability. This lactone ring-opening polymerization catalyst contains a salen type metal complex and is useful for producing a polyester and a block copolymer, in particular for producing biodegradable plastics and mendical materials.

WO 2010/110460 discloses a method for producing a lactide/epsilon-caprolactone copolymer whereby a lactide/epsilon-caprolactone copolymer being close to an ideal random copolymer can be produced while controlling the molecular weight and the molecular weight distribution. Lactide is copolymerized with epsilon-caprolactone by using an aluminum-salen complex as a catalyst.

The scientific article "Ring opening oligomerisation reactions using aluminium complexes of Schiff's bases as initiators" (Le Borgne et al., Makromol. Chem., macromol. Symp. 73, 37-46 (1993)) discloses aluminium initiators derived from Schiff's bases which were successfully used for oligomerization of oxiranes, lactones and lactides.

In view of the prior art, it would be highly desirable to provide a suitable catalyst for metal-mediated ring-opening polymerization of lactones capable of achieving similar conversions and molecular weights as reported for enzymatic ring-opening polymerization. Furthermore, it would be desirable to combine the advantages of enzymatic ring-opening polymerization of lactones with the thermostability of metal-mediated ring-opening polymerization and with the versatility of metal-mediated ring-opening polymerization regarding control of molecular weight, molecular weight distribution and end-groups.

SUMMARY

Disclosed herein are metal complex catalysts and methods for using the same.

In one embodiment, a process for preparing an polyester, comprises:
providing an optionally substituted lactone having a ring size of from 6 to 40 carbon atoms; and
subjecting said lactone to metal mediated ring opening polymerization using as catalyst a compound according to general formula (I):

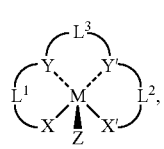

(I)

wherein
M is selected from the group consisting of Al, Ti, V, Cr, Mn and Co;
X and X' are independently a heteroatom;
Y and Y' are independently selected from the group consisting of O, N, S, P, C, Si, and B;
Z is selected from the group consisting of hydrogen, borohydrides, aluminum hydrides, carbyls, silyls, hydroxide, alkoxides, aryloxides, carboxylates, carbonates, carbamates, amidos, thiolates, phosphides, and halides;
$L^1$ and $L^2$ are independently an organic ligand linking X and Y together and linking X' and Y' together, respectively; and
$L^3$ is an optional organic ligand linking Y and Y' together.

DETAILED DESCRIPTION

The inventors surprisingly found that, unlike other metal complex catalysts, the metal complex catalyst of formula (I) is capable of efficiently catalyzing the metal mediated ring-opening polymerization of lactones in a fashion yielding polymers with similar properties, such as polydispersity index and molecular weight than those obtainable by enzymatic ring-opening polymerization. Furthermore, the metal-mediated ring-opening polymerization of lactones of the invention was found to have surprisingly fast polymerization kinetics as compared to other metal-based ring-opening catalysts in ring-opening polymerization of lactones and is comparable or better than enzymatic ring-opening polymerization of lactones.

In an embodiment of the compound according to general formula (I) it is preferred that X and X' are identical. It also preferred that Y and Y' are identical. It is further preferred that $L^1$ and $L^2$ are identical.

Substituent Z can inter alia be a borohydride or an aluminium hydride. Borohydrides (e.g. $BH_4$) and aluminium hydrides (e.g. $AlH_4$) are anionic species that bind via the hydrides. This may be illustrated as $M(\mu\text{-}H)_2AH_2$ (M=as defined above, A=B, Al).

Examples of the organic ligands $L^1$, $L^2$, and $L^3$ include tetradentate ligands (such as porphyrins, and salen and related Shiff bases), tridentate ligands (such as trispyrrazolyl borates, and trispyrrazolyl methanes), and bidentate ligands (such as phenoxyimines, (phenoxy)ketimines, and enolatoimines).

In various embodiments, preferably, both X and X' are O. It is preferred that both Y and Y' are N. Accordingly, a catalyst of the following formula (II) can be used:

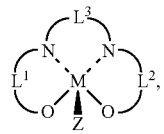

(II)

wherein M, Z, $L^1$, $L^2$, and $L^3$ are the same as defined above.
$L^1$ and $L^2$ are preferably selected from the following list of organic moieties:

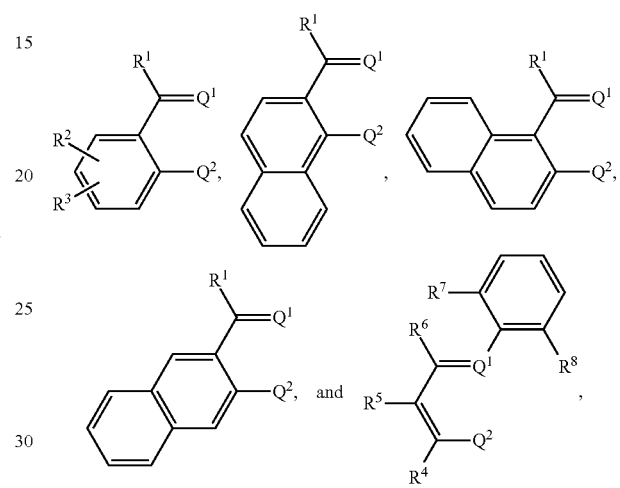

wherein $Q^1$ indicates the position of the moiety that links to Y and/or Y' and $Q^2$ indicates the position of the moiety that links to X and/or X', and wherein
$R^1$ is selected from hydrogen, $C_{1-6}$ alkyl (such as methyl, ethyl or propyl), or phenyl; and
$R^2$ and $R^3$ are independently selected from hydrogen, $C_{1-10}$ alkyl, silyl, $C_{1-6}$ alkoxy, $C_{3-8}$ cycloalkyl, $C_{3-8}$ cycloalkoxy, aryl, aryloxy, a halide (F, Cl, Br, I), and a 5- or 6-membered heterocycle containing from 1 to 4 heteroatoms selected from oxygen, sulfur, nitrogen and phosphorous;
$R^4$, $R^5$, and $R^6$ are independently selected from hydrogen, $C_{1-10}$ alkyl, $C_{1-10}$ halogenated alkyl (such as fluorinated alkyl) silyl, $C_{1-6}$ alkoxy, $C_{3-8}$ cycloalkyl, $C_{3-8}$ cycloalkoxy, aryl, aryloxy, a halide (F, Cl, Br, I), and a 5- or 6-membered heterocycle containing from 1 to 4 heteroatoms selected from oxygen, sulfur, nitrogen and phosphorous, or $R^4$ and $R^5$ together form a 5- or 6-membered cyclic system optionally containing from 1 to 4 heteroatoms, or $R^5$ and $R^6$ together form a 5- or 6-membered cyclic system optionally containing from 1 to 4 heteroatoms; and
$R^7$ and $R^8$ are independently selected from hydrogen, $C_{1-10}$ alkyl, silyl, $C_{1-6}$ alkoxy, $C_{3-8}$ cycloalkyl, $C_{3-8}$ cycloalkoxy, aryl, aryloxy, a halide (F, Cl, Br, I), and a 5- or 6-membered heterocycle.

Hence for $L^1$, $Q^1$ indicates the position of the moiety that links to Y and $Q^2$ indicates the position of the moiety that links to X;

Hence for $L^2$, $Q^1$ indicates the position of the moiety that links to Y' and $Q^2$ indicates the position of the moiety that links to X';

The optional group $L^3$ is preferably a straight or branched aliphatic chain, or cyclic or aromatic moiety, that contains 2 to 30 carbon atoms, optionally containing 1 to 10 heteroatoms selected from N, O, F, Cl and Br. More preferably, $L^3$ is selected from the group consisting of —(CH$_2$)$_2$—, 1,2-phenyl, and 1,2-cyclohexyl.

Even more preferably, the catalyst compounds used in the process of the invention are compounds of general formula (III) below

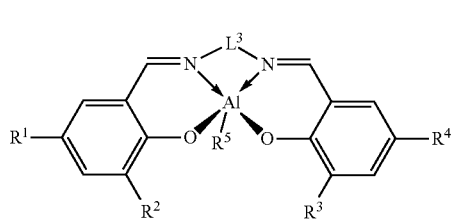

wherein
- $L^3$ has the same meaning as defined above, and is preferably selected from —(CH$_2$)$_2$—, 1,2-phenyl, and 1,2-cyclohexyl;
- $R^{1-4}$ are independently selected from hydrogen, $C_{1-10}$ alkyl, silyl, $C_{1-6}$ alkoxy, $C_{3-8}$ cycloalkyl, $C_{3-8}$ cycloalkoxy, aryl, aryloxy, a halide (F, Cl, Br, I), and a 5- or 6-membered heterocycle containing from 1 to 4 heteroatoms selected from oxygen, sulfur, nitrogen, and phosphorous; and
- $R^5$ is selected from hydrogen (H), borohydrides (BH$_{4-x}$R$_x$, wherein x is an integer from 0-3 and R is carbyl, alkoxide), aluminum hydrides (AlH$_{4-x}$R$_x$, wherein x is an integer from 0-3 and R is carbyl alkoxide), carbyls (any hydrocarbon, —CR$_3$, —Ar (aryl), —CR=CR$_2$, —C≡CR, wherein R is hydrogen, optionally substituted alkyl, optionally substituted aryl), silyls (—SiR$_3$, wherein R is hydrogen, optionally substituted alkyl, optionally substituted aryl), hydroxide (—OH), alkoxides (—OR, wherein R is optionally substituted alkyl), aryloxides (—OAr), carboxylates (—OC(=O)R, wherein R is hydrogen, optionally substituted alkyl, optionally substituted aryl), carbonates (—OC(=O)OR, wherein R is optionally substituted alkyl, optionally substituted aryl), carbamates (—OC(=O)NR$_2$, wherein R is optionally substituted alkyl, optionally substituted aryl), amidos (—NR$_2$, wherein R is hydrogen, optionally substituted alkyl, optionally substituted aryl), thiolates (—SR, wherein R is hydogen, optionally substituted alkyl, optionally substituted aryl), phosphides (—PR$_2$, wherein R is hydrogen, optionally substituted alkyl, optionally substituted aryl), and halides (F, Cl, Br, I).

The term "carbyl" as used in this application is meant to refer to all types of hydrocarbons (including alkyl, aryl, vinyl, acetylene, etc.).

The substituents $R^1$, $R^2$, $R^3$, and $R^4$ are independently selected from hydrogen, $C_{1-10}$ alkyl, silyl, $C_{1-6}$ alkoxy, $C_{3-8}$ cycloalkyl, $C_{3-8}$ cycloalkoxy, aryl, aryloxy, a halide (F, Cl, Br, I), and a 5- or 6-membered heterocycle containing from 1 to 4 heteroatoms selected from oxygen, sulfur, nitrogen and phosphorous. Larger, bulky substituents were found to have a negative effect on the polymerization rate. Without wishing to be bound by any theory, the inventors believe that bulky residues $R^1$, $R^2$, $R^3$, and $R^4$ induce steric hindrance around the aluminum core, which is believed to increase the energy barrier for the monomers to approach the core. This, in turn, will decrease the rate of the reaction substantially. Therefore, in a preferred embodiment the substituents $R^1$, $R^2$, $R^3$, and $R^4$ are relatively small. The substituents $R^1$, $R^2$, $R^3$, and $R^4$ can, for instance, be independently selected from hydrogen, methyl, ethyl, propyl, isopropyl, n-butyl, i-butyl, s-butyl, t-butyl, n-pentyl, i-pentyl, neopentyl, n-hexyl, 2,2-dimethylbutane, 2-methylpentane, 3-methylpentane, 2,3-dimethylbutane, cyclohexane, methoxide, ethoxide, (n-/t-)butoxide, aryloxide halides. Even more preferably, the substituents $R^1$, $R^2$, $R^3$, and $R^4$ are independently selected from hydrogen, methyl, ethyl, propyl, n-butyl, i-butyl, s-butyl, and t-butyl. Most preferably, the substituents $R^1$, $R^2$, $R^3$, and $R^4$ are independently selected from hydrogen, methyl, ethyl.

In an embodiment at least two of the substituents $R^1$, $R^2$, $R^3$, and $R^4$ are identical. In a further embodiment, at least three of $R^1$, $R^2$, $R^3$, and $R^4$ are identical. In yet a further embodiment all of $R^1$, $R^2$, $R^3$, and $R^4$ are identical. From a practical point of view, this last embodiment is preferred.

Substituent $R^5$ is preferably an alkoxide (—OR, wherein R is optionally substituted alkyl, optionally substituted aryl), a carboxylate (—OC(=O)R, wherein R is optionally substituted alkyl, optionally substituted aryl), an amido (—NR$_2$, wherein R is optionally substituted alkyl, optionally substituted aryl), a thiolate (—SR, wherein R is optionally substituted alkyl, optionally substituted aryl), or borohydride (BH$_{4-x}$R$_x$, wherein x is an integer of from 1-3 and R is optionally substituted alkyl, (substituted) aryl). These substituents are able to initiate the ring-opening polymerization reaction themselves. Compounds according to general formula (III) having a different $R^5$ substituent (such as a metal alkyl or hydride) can be used in combination with a suitable initiator compound such as an alcohol, water, carboxylic acid or amine. The mechanism and initiation of ring-opening polymerization is well-known to the skilled person and is for instance described in "Handbook of Ring-Opening Polymerization, 2009, Eds. Philippe Dubois, Olivier Coulembier, Jean-Marie Raquez, Wiley-VCH, ISBN: 978-3-527-31953-4".

In a preferred embodiment, $R^5$ is selected from the group consisting hydrogen, methyl, ethyl, n-octyl, methoxy, ethoxy, and benzoxy (—OCH$_2$C$_6$H$_5$).

Good results were obtained with compounds according to general formula (I), wherein $R^1$, $R^2$, $R^3$, and $R^4$ are independently selected from hydrogen, methyl, ethyl, propyl, isopropyl, butyl, n-butyl, isobutyl, t-butyl, and wherein $R^5$ is selected from hydrogen, methyl, ethyl, i-propyl, t-butyl.

The lactone used in the process of the invention is a lactone having a ring size of 6 to 40 carbon atoms. Ring sizes of less than 6 carbon atoms result in unacceptable low conversion and very low molecular weight. Furthermore, the five-membered ring of γ-butyrolactone is thermodynamically so stable that it is hard to ring-open and accordingly γ-butyrolactone cannot be efficiently used in the process of the invention. Preferably, the lactone is selected from δ-valerolactone, ε-caprolactone, 7-heptanolactone, 8-octalactone, 9-nonalactone, 10-decalactone, 11-undecalactone, 12-dodecalactone, 13-tridecalactone, 14-tetradecalactone, 15-pentadecalactone, and 16-hexadecalactone. In each of these notations, the prefix specifies the number of carbons in the heterocyle (i.e. the distance between the relevant ester groups along the backbone). Therefore, the prefixes also indicate the size of the lactone ring. Preferably, the lactone used in the process of the invention has a ring size of 9-40 carbon atoms, even more preferably a ring size of 10-40 carbon atoms, such as a ring size of 12-40 carbon atoms. When using such lactones with relatively large ring sizes, the polymerization rate is relatively high.

In an embodiment, the lactone is selected from 10-decalactone, 11-undecalactone, 12-dodecalactone, 13-tridecalactone, 14-tetradecalactone, 15-pentadecalactone and 16-hexadecalactone.

Good results have, for instance, been obtained with lactones selected from 10-decalactone, 11-undecalactone, 15-pentadecalactone, and 16-hexadecalactone.

The lactone may be substituted by one or more substituents that do not interfere in the ring-opening polymerization reaction. Examples of such lactones, for example, include 4-methyl caprolactone, 1,5-dioxepan-2-one (ether substituent at the 2 position), the lactone of ricinoleic acid (a 10-membered ring with a hexyl branched on the ($\omega$-1)-position), 13-hexyloxacyclotridecan-2-one (a macrocycle with a hexyl branch on the $\omega$-position), and the like.

It is further possible that the lactone comprises one or more unsaturations in the ring. Examples of such lactones include 5-tetradecen-14-olide, 11-pentadecen-15-olide, 12-pentadecen-15-olide (also known as globalide), 7-hexadecen-16-olide (also known as ambrettolide), 9-hexadecen-16-olide.

Also lactones having one or more heteroatoms in the ring may be used. Examples of such lactones include 10-oxahexadecanolide, 11-oxahexadecanolide, 12-oxahexadecanolide, and 12-oxahexadecen-16-olide.

In addition, it is possible to use lactones wherein the ring size is not maximal. Examples of such lactones include 6-decanolide, 6-dodecanolide, 8-hexadecanolide, 10-hexadecanolide, 12-hexadecanolide, and 6-decen-6-olide.

In the process of the invention the molecular ratio between the lactone and the catalyst is preferably in the range of 20:1-1000:1, preferably in the range of 40:1-750:1, more preferably in the range of 50:1-500:1.

As mentioned before, in some cases the catalyst used in herein may be applied in combination with an initiator, preferably in about equimolar ratio. Suitable initiators for the process of the present invention include alcohols, water, carboxylic acids, and amines. Such initiators are well-known to the person skilled in the art and examples thereof can, for instance, be found in Clark et al., Chem. Commun 2010, 46, 273-275 and references cited therein, which document is herewith incorporated by reference.

If the ring-opening polymerization is performed in the presence of an initiator, the molecular ratio between initiator and catalyst is usually about 1:1, unless the reagent used as initiator is also used as chain transfer agent. Hence, the molecular ratio between the lactone and the initiator will then be equal to the molecular ratio between the lactone and the catalyst. The molecular ratio between the lactone and the initiator (and thus inherently the molecular ratio between the lactone and the catalyst) can be used as a tool for tuning the molecular weight of the polyester or copolymer that is prepared. The inventors found that the molecular weight of the polyester or copolymer increases almost linearly with an increasing lactone to initiator ratio.

In case the initiator is used as a chain transfer agent, then the initiator is added in excess with respect to the catalyst to produce more than one chain per active site. The amount of applied catalyst can be reduced in the presence of a chain transfer agent due to an increase in catalyst efficiency. If present, the molar amount of chain transfer agent will typically be in the range of 1-10 000 times the molar amount of catalyst, preferably in the range of 10-100 times the molar amount of catalyst.

The ring-opening polymerization reaction is preferably performed in an inert atmosphere, such as in a nitrogen atmosphere. It is generally known that aluminum-salen complex catalysts perform better under inert atmosphere and preferably in the absence of (significant amounts of) water.

If desired, the ring-opening polymerization can be performed in the presence of a solvent, such as aliphatic or aromatic hydrocarbons (e.g. heptane, toluene), halogenated aliphatic or aromatic hydrocarbons (e.g. dichloromethane, bromobenzene), ethers (e.g. diethyl ether). The solvent may be used to dissolve the lactones and/or to increase the polymerization kinetics and selectivity.

The process can be used for the preparation of a polyester or copolymer with a number average molecular weight of 10 000 g/mol or more as measured by size exclusion chromatography in 1,2,4-trichlorobenzene at 160° C. using polystyrene calibration, such as 15 000 g/mol or more, or 20 000 g/mol or more. In an embodiment, the number average molecular weight of the polyester or copolymer prepared by the process is in the range of 10 000-200 000 g/mol. The exact obtained molecular weight depends on the molecular ratio between the lactone and the catalyst and further on the type of lactone(s) that is (are) employed in the reaction. In a special embodiment, the lactone used has a ring size of more than 9 and the polyester produced has a number average molecular weight of 100 000 g/mol or more, such as in the range of 100 000-200 000 g/mol.

Polyesters or copolymers prepared by the process can have a polydispersity index in the range of 1.2-3.5, such as in the range of 1.5-3.2.

The process was found to have a high lactones polymerization rate as compared to other metal-based catalysts and enzymatic ring-opening polymerization of lactones. The ring-opening polymerization in the process of the invention can occur with a polymerization rate of 0.01 min$^{-1}$ or more, such as 0.02 min$^{-1}$, or 0.03 min$^{-1}$ as measured at a process temperature of 100° C. The polymerization rate in the process of the invention can, for example, be as high as 0.25 min$^{-1}$, or 0.30 min$^{-1}$ as measured at a process temperature of 100° C.

Advantageously, the process can be conducted at relatively high process temperatures, at which enzymes used for enzymatic ring-opening polymerization of lactones would normally degrade. Typically, the process can be performed at a temperature in the range of from 70-180° C., such as in the range of from 80-175° C., or in the range of from 90-150° C.

In a special embodiment, the process can be used for the preparation of copolymers by applying two or more lactones as described herein, or a lactone as described herein and a monomer different from a lactone as described herein in the metal-mediated ring-opening polymerization reaction. The monomer different from lactone can, for instance, be selected from (D-, L-, or D,L-) lactide, glycolide, morpholine dione, epoxy and anhydride, cyclic carbonates, epoxide and $CO_2$/ $CS_2$, oxetane and anhydride, oxetane and CO/$CS_2$, aziridines and anhydrides, aziridines and $CO_2$/$CS_2$, etc. This allows, for example, the preparation of (random or block) copolyesters and poly(estercarbonate)s.

Since the amount of catalyst used in the process, there is no direct need for separating the catalyst from the polymer product. However, should there be a need for separating the catalyst from the polymer for whatever reason then the catalyst can, for instance, be separated from the polymer by precipitation of the polymer in a suitable solvent.

Compounds of general formula (III) can be obtained relatively easily. The salen ligands are conventionally obtained via a direct condensation reaction between a 1,2-diamine and a salicylaldehyde. The reaction is a condensation reaction. In a next step, triethyl aluminum (AlEt$_3$) is reacted with one of the hydroxyl groups of the salen ligand. Ethane is formed and leaves the reaction as a gas. A covalent bond is formed between the oxygen and aluminum and a dative bond is formed between the nitrogen and aluminum. This step is very fast and highly exothermic. Thereafter, a more timely conformal rearrangement takes place. After this rearrangement a molecule of ethane is again eliminated leaving the aluminum salen complex.

Polyesters and copolymers obtained with the process can be used in a wide variety of applications depending on their respective properties, such as number average molecular weight, polydispersity index, etc. Some non-limitative exemplary applications include the following. The polyesters and copolymers may be comprised in the fabrication of fibers with high mechanical strength. Especially polyesters and copolymers with high molecular weight are suitable for this purpose. For fiber applications it is further preferred that the polymers have a relatively low polydispersity index. Furthermore, the polyesters and copolymers may be used for biomedical applications. In this respect it is highly advantageous that the degradability of the copolymers can be tuned by the choice of comonomer. Examples of biomedical applications include screws (such as for bone), scaffolding, sutures, drug delivery devices, etc. In addition, the polyesters and copolymers obtained by the process may be used as a general alternative for polyethylene. In contrast to polyethylene, however, the polyesters and copolymers are advantageously biodegradable (rate of biodegradability can optionally be tuned by choosing one or more appropriate comonomers) and biocompatible. Hence, litter of the applied polymer will eventually completely degrade in a time span of months to years as compared to a time span of ages for polyethylene.

The invention will now be further illustrated by means of the following Examples, which are not intended to be limitative in any way.

EXAMPLES

γ-Butyrolactone, β-butyrolactone, 15-pentadecalactone, 16-hexadecalactone, ε-caprolactone, δ-valerolactone, 11-undecalactone, mesitylene and benzylalcohol were purchased from Aldrich. 10-Decalactone was synthesized following the procedure described by Van der Mee et al. in Macromolecules 2006, 39, 5021-5027. All monomers, mesitylene and benzylalcohol were distilled before use. Toluene and trichlorobenzene were purchased from Biosolve. Toluene was dried over an alumina column prior to use. Aluminum salen complexes were synthesized following the procedure described by Dzugan et al. in Inorg. Chem. 1986, 25, 2858-2864.

Methods $^1$H and $^{13}$C NMR spectroscopy was performed on a Varian Mercury 400 MHz NMR in $CDCl_3$. Data was acquired using VNMR software. Chemical shifts are reported in ppm relative to tetramethylsilane (TMS). Low Molecular Weight Size Exclusion Chromatography (LMW-SEC) was performed on a Waters Alliance system equipped with a Waters 2486 UV detector and a Polymer Laboratories PLgel guard column (5 mm particles) 50×7.5 mm, followed by 2 PLgel 5 mm Mixed-D columns in series at 40° C. Size Exclusion Chromatography (SEC) was measured on a Waters Alliance system equipped with a waters 2695 separation module, a Waters 2414 refractive index detector (40 C), a Waters 2487 dual absorbance detector and a PSS SDV 5 m guard column followed by 2 PSS SDV linear XL columns in series of 5 m (8×300) at 40° C. Tetrahydrofuran (THF, Biosolve) stabilized with butylated hydroxytoluene (BHT), was used as eluent for LMS-SEC and SEC at a flow rate of 1 ml/min. The molecular weights were calculated with respect to polystyrene standards (Polymer Laboratories, $M_p$=580 up to $M_p$=7.1×10$^6$ g/mol).

Before analysis was performed, the samples were filtered through a 0.2 μm polytetrafluoroethylene (PTFE) filter (13 mm, polypropylene (PP) housing, Alltech). High Temperature Size Exclusion Chromatography (HT-SEC) was performed on a Polymer Laboratories PLXT-20 Rapid GPC Polymer Analysis System (including pump, refractive index detector and viscosity detector) at 160° C. with 3 PLgel Olexis (300×7.5 mm, Polymer Laboratories) columns in series. 1,2,4-Trichlorobenzene was used as eluent at a flow rate of 1 ml/min. The molecular weights were calculated with respect to polystyrene standards (Polymer Laboratories, $M_p$=580 up to $M_p$=7.1×10$^6$ g/mol). A Polymer Laboratories PL XT-220 robotic sample handling system was used as autosampler. Matrix-Assisted Laser Desorption Ionization time-of-flight Mass Spectrometry (MALDI-tof-MS) was performed on a PerSeptive Biosystem Voyager-DE STR Biospectrometry-Workstation in positive reflector mode. An acceleration voltage of 20 000 V, a grid of 63.2% and a delay time of 320 ns and 1000 shots per spectrum were used.

Trans-2-[3-(4-tert-butylphenyl)-2-methyl-propenylidene]-malononitril ≥99% from Fluka was used as a matrix and potassium trifluoroacetate was used as a salt in a ratio salt:matrix:sample of 1:4:4. For sample preparation the poly(pentadecalactone) (PPDL) samples were dissolved in hexafluoroisopropanol (HFIP) and the other polylactone samples in THF.

Synthetic Methods

Figures in bold indicate the respective structures in Scheme 1

N,N'-Bis(salicylidene)-1,2-diaminoethylene ethyl aluminum (1)

Salicylaldehyde (3.9 g; 32 mmol) and ethylenediamine (1.0 g; 16 mmol) were added to 40 mL ethanol in a 100-mL one-necked flask. The mixture was stirred for 3 hours at room temperature. The formed precipitate was filtered off with a Büchner funnel. The precipitate was washed three times with 20 mL methanol. The solids were collected and dried overnight at 40° C. under vacuum. The intermediate ligand N,N'-bis(salicylidene)-1,2-diaminoethylene was obtained as a yellow solid with a yield of 80.5% (3.62 g; 13.5 mmol).

$^1$H-NMR ($CDCl_3$) δ(ppm): 13.19 (s, 2H, PhOH), 8.36 (s, 2H, N=CH), 7.15 (m, 4H, PhH), 6.95 (m, 4H, PhH), 3.94 (s, 4H, $NCH_2$).

The obtained intermediate ligand N,N'-bis(salicylidene)-1,2-diaminoethylene (2.14 g; 7.9 mmol) was dispersed in dry acetonitrile. A 0.95 M solution of $AlEt_3$ in toluene was added (8.5 mL; 8.08 mmol). The yellow clear solution was heated until the volume was reduced by 50%. Upon cooling yellow needles precipitated and the remaining liquid was removed by a cannula. The solid was washed twice with petroleum ether and dried at room temperature under vacuum. The pale yellow needles were obtained with a yield of 78.5% (1.99 g; 6.2 mmol).

$^1$H-NMR ($CDCl_3$) δ(ppm): 8.27 (s, 2H, N=CH), 7.36 (t, 2H, PhH), 7.13 (d, 2H, PhH), 7.08 (d, 2H, PhH), 6.69 (t, 2H, PhH), 3.91 (h, 2H, $NCH_2$), 3.64 (h, 2H, $NCH_2$). 0.74 (t, 3H, $AlCH_2CH_3$), −0.32 (q, 2H, $AlCH_2CH_3$).

N,N'-Bis(3,5-ditertbutylsalicylidene)-1,2-diaminoethylene ethyl aluminum (2)

3,5-Ditertbutylsalicylaldehyde (4.46 g; 18 mmol) and ethylenediamine (0.57 g; 9.5 mmol) were added to 40 mL ethanol in a 100-mL one-necked flask. The mixture was stirred for 3 hours at room temperature. The formed precipitate was filtered off with a Büchner funnel. The precipitate was washed three times with 20 ml methanol. The solids were collected and dried overnight at 40° C. under vacuum. The intermediate ligand N,N'-bis(3,5-ditertbutylsalicylidene)-1, 2-diaminoethylene was obtained as a yellow powder with a yield of 92.9% (4.35 g; 8.8 mmol).

$^1$H-NMR (CDCl$_3$) δ(ppm): 13.64 (s, 2H, PhOH), 8.39 (s, 2H, N=CH), 7.36 (m, 2H, PhH), 7.06 (s, 2H, PhH), 3.92 (s, 4H, NCH$_2$), 1.44 (s, 9H, C(CH$_3$)$_3$).

The obtained intermediate ligand N,N'-bis(3,5-ditertbutylsalicylidene)-1,2-diaminoethylene (2.04 g; 4.14 mmol) was dissolved in toluene. AlEt$_3$ (3.5 mL; 4.55 mmol) was added by a syringe and the mixture was refluxed for 3 hours. After refluxing, the yellow clear solution was cooled to room temperature. After cooling the solvent was evaporated under vacuum. A yellow solid was obtained with a yield of 70.2% (1.58 g; 2.9 mmol).

$^1$H-NMR (CDCl$_3$) δ(ppm): 7.86 (s, 1H, N=CH), 7.50 (s, 1H, N=CH), 7.05 (m, 4H, PhH), 3.15 (m, 2H, NCH$_2$), 2.63 (m, 2H, NCH$_2$), 1.80 (s, 9H, C(CH$_3$)$_3$), 1.39 (s, 9H, C(CH$_3$)$_3$), 1.15 (t, 3H, AlCH$_2$CH$_3$), 0.05 (q, 2H, AlCH$_2$CH$_3$).

N,N'-Bis(salicylidene)-1,2-diaminoethylene benzyl alkoxy aluminum (3)

Aluminum salen complex (1) (1.044 g; 3.24 mmol) was dispersed in toluene. BnOH (0.748 g; 6.68 mmol) was added by a syringe and the mixture was stirred at 100° C. overnight. This yielded a white solid in a clear liquid. The dispersion was cooled in an ice bath and washed two times with 15 mL of toluene. This yielded pale white crystals with a yield of 79.6% (2.57 mmol).

$^1$H-NMR (CDCl$_3$) δ(ppm): 8.24 (s, 2H, N=CH), 7.41 (m, 2H, PhH), 7.15 (m, 2H, PhH), 7.07 (m, 2H, PhH), 6.75 (t, 2H, PhH), 4.62 (s, 2H, OCH$_2$), 4.02 (h, 2H, NCH$_2$), 3.66 (h, 2H, NCH$_2$).

N,N'-Bis(3,5-ditertbutylsalicylidene)-1,2-diaminoethylene benzyl alkoxy aluminum (4)

Aluminum salen complex (2) (0.338 g; 0.62 mmol) was dissolved in toluene. BnOH (0.157 g; 1.5 mmol) was added by a syringe and the mixture was stirred at 100° C. overnight. Afterwards the solvent was evaporated under vacuum. The obtained yellow solid was washed with 5 mL PET-ether. The remaining BnOH was evaporated, using high vacuum and a heat gun. This yielded a yellow powder.

$^1$H-NMR (CDCl$_3$) δ(ppm): 8.28 (s, 2H, N=CH), 7.51 (d, 2H, PhH), 7.03 (m, 5H, PhH), 6.97 (d, 2H, PhH), 4.56 (s, 2H, OCH$_2$), 4.02 (m, 2H, NCH$_2$), 3.66 (m, 2H, NCH$_2$), 1.55 (s, 18H, C(CH$_3$)$_3$), 1.31 (s, 18H, C(CH$_3$)$_3$).

Exemplary chemical ring opening polymerization of 15-pentadecalactone

15-Pentadecalactone (1.0 g; 4.2 mmol), an aluminum salen catalyst indicated in Scheme 1, and benzylalcohol (co-initiator) were added to a vial under nitrogen atmosphere. Benzyl alcohol was only added when complex 1 or 3 indicated in Scheme 1 were used. The molar ratio of benzyl alcohol to the catalyst was kept constant at 1:1, while the monomer to initiator ratio was varied from 44 to 520. The vial was then closed and stirred at 100° C. for 4 h. For the reactors in solution, toluene (2 mL) was added to the polymerizations prior to heating. After the reaction the mixture was cooled in an ice bath and the solvent was evaporated. The products were analyzed without further precipitation.

Kinetic Experiments

Monomer (1 mmol) and aluminum salen catalyst (10 μmol) were added in a 5 mL crimp cap vial in a glovebox under N$_2$ atmosphere. Eight samples were made per polymerization reaction. The samples were taken out of the glovebox and 0.25 mL stock solution containing BnOH in a concentration of 40 μmol/mL in toluene was added. A ratio monomer:catalyst:BnOH of 100:1:1 was obtained and a monomer concentration of 4 mol/L. The vials were put in a carrousel reactor preheated to 100° C. and the samples were quenched with 4 ml of cold methanol at predetermined times. The samples were dried to the air at room temperature prior to analysis. All samples were analyzed with Gas Chromatography (GC), HT-SEC, and $^1$H-NMR.

Polyvalerolactone: $^1$H-NMR (CDCl$_3$) δ(ppm): 7.38 (s, 5H, PhH), 5.08 (s, 2H, PhCH$_2$O), 4.07 (t, 2H, CH$_2$O), 2.34 (t, 2H, CH$_2$C=O), 1.62 (m, 4H, CH$_2$CH$_2$O).

Polycaprolactone: $^1$H-NMR (CDCl$_3$) δ(ppm): 7.38 (s, 5H, PhH), 5.11 (s, 2H, PhCH$_2$O), 4.04 (t, 2H, CH$_2$O), 2.31 (t, 2H, CH$_2$C=O), 1.66 (m, 4H, CH$_2$CH$_2$O), 1.37 (m, 2H, CH$_2$CH$_2$).

Polydecalactone: $^1$H-NMR (CDCl$_3$) δ(ppm): 7.35 (s, 5H, PhH), 5.11 (s, 2H, PhCH$_2$O), 4.04 (t, 2H, CH$_2$O), 2.30 (t, 2H, CH$_2$C=O), 1.61 (m, 4H, CH$_2$CH$_2$O), 1.31 (m, 10H, CH$_2$CH$_2$).

Polyundecalactone: $^1$H-NMR (CDCl$_3$) δ(ppm): 7.33 (s, 5H, PhH), 5.10 (s, 2H, PhCH$_2$O), 4.06 (t, 2H, CH$_2$O), 2.28 (t, 2H, CH$_2$C=O), 1.60 (m, 4H, CH$_2$CH$_2$O), 1.27 (m, 12H, CH$_2$CH$_2$).

Polypentadecalactone: $^1$H-NMR (CDCl$_3$) δ(ppm): 7.35 (s, 5H, PhH), 5.10 (s, 2H, PhCH$_2$O), 4.05 (t, 2H, CH$_2$O), 2.26 (t, 2H, CH$_2$C=O), 1.59 (m, 4H, CH$_2$CH$_2$O), 1.24 (m, 20H, CH$_2$CH$_2$).

Polyhexadecalactone: $^1$H-NMR (CDCl$_3$) δ(ppm): 7.34 (s, 5H, PhH), 5.09 (s, 2H, PhCH$_2$O), 4.05 (t, 2H, CH$_2$O), 2.28 (t, 2H, CH$_2$C=O), 1.60 (m, 4H, CH$_2$CH$_2$O), 1.23 (m, 22H, CH$_2$CH$_2$).

Results

The high efficiency of the catalyst in the polymerization of lactones was immediately evident from the fast reaction. The viscosity of the reaction medium increased rapidly within minutes and after about 20 minutes agitation stopped. Even though a rapid viscosity increase with conversion is known from enzymatic synthesis (e.g. of polypentadecalactone), for a metal catalyst such fast polymerization kinetics for the ring opening polymerization of lactones (such as pentadecalactone) is remarkable. Some of the results of the ring opening polymerization catalyzed by 1 in the presence of an equimolar amount of BnOH using various monomer to catalyst ratios (M:C) are shown in Table 1.

For the lower ratios of monomer to 1, $^1$H-NMR spectroscopy (see Table 1, entries 1 and 2) showed an almost quantitative monomer conversion within the applied reaction time of 1 hour. When the ratio was increased the monomer conversion leveled off between 70 and 74% (Table 1, entries 4 and 5), most likely due to diffusion limitations caused by the high viscosity of the reaction mixture. It should be noted that it is likely that monomer conversions for the higher molecular weight polypentadecalactones are underestimated due to the low solubility of polypentadecalactone in deuterated chloroform.

The measured number average molecular weights in Table 1 range from 24 000 g/mol for the monomer to catalyst ratio of 44, to 118 000 g/mol for the ratio of 424, respectively. Noticeable is that the molecular weight increases almost linearly with an increasing monomer to initiator ratio. The polydispersity index (PDI) of the obtained polypentadecalatones range from 2.1 to 2.8, which supports the expectation that the aluminum salen complex is a single-site catalyst. It also suggests the presence of transesterification reactions.

TABLE 1

| Entry | Lactone | Solvent | M:C | $M_n$ calc. (g/mol)[a] | $M_n$ (g/mol) | PDI | Conversion (%)[b] |
|---|---|---|---|---|---|---|---|
| 1 | PDL | — | 44 | 11 000 | 24 000 | 2.8 | >99 |
| 2 | PDL | — | 110 | 26 000 | 41 000 | 2.6 | >99 |
| 3 | PDL | — | 212 | 38 000 | 99 000 | 2.1 | 74 |
| 4 | PDL | — | 424 | 71 000 | 118 000 | 2.5 | 70 |
| 5 | PDL | toluene | 109 | 26 000 | 33 000 | 2.5 | >99 |
| 6 | PDL | toluene | 213 | 49 000 | 100 000 | 2.4 | 95 |
| 7 | PDL | toluene | 427 | 58 000 | 155 000 | 2.0 | 57 |
| 8 | CL | toluene | 520 | 59 000 | 36 000 | 1.5 | >99 |

[a][Monomer]/[catalyst] × conversion × $M_w$ (monomer).
[b]Determined by $^1$H-NMR in CDCl$_3$ by comparison of the methylene peak adjacent to the ester group of the monomer (δ 4.14 ppm) and the polymer (δ 4.04 ppm).

In addition to polymerizations using complex 1 in combination with benzyl alcohol as the catalytic system, polymerizations were performed using complex 2 in combination with benzyl alcohol as the catalytic system, using complex 3 as the catalytic system, and using complex 4 as the catalytic system. The chemical structures of these complexes are shown in Scheme 1.

As can be observed in FIG. 1 (showing the conversion vs. time of the polymerization of pentadecalactone using different salen complexes, [complex]=0.16 M, [lactone]$_0$=1.5 M, T=100° C., t=4 hours; ●=1, ▲=2, ◆=3, ■=4), polymerization using complex 1 or 2 resulted in complete conversion. The highest conversion reached using complex 4 was 87% and 93% using 2. This can be seen in Table 2, which shows the results of the ring-opening polymerization of pentadecalactone using different complexes (in Table 2: [complex]=0.16 M, [lactone]$_0$=1.5 M, T=100° C.).

TABLE 2

| Complex | $k_{app}$ (min$^{-1}$) | $M_n$ calc. (g/mol)[a] | $M_n$ (NMR) (g/mol) | $M_n$ (SEC) (g/mol) | PDI | Conversion (%)[b] |
|---|---|---|---|---|---|---|
| 1[c] | 0.20 ± 0.02 | 2700 | 3900 | 8100 | 1.7 | 98 |
| 2[c] | (10 ± 1) · 10$^{-3}$ | 2300 | 3000 | 8400 | 1.5 | 93 |
| 3[d,e] | (140 ± 6) · 10$^{-3}$ | 2700 | 8000 | 17 000 | 1.6 | 99 |
| 4[e] | (89 ± 2) · 10$^{-4}$ | 2300 | 3500 | 10 000 | 1.6 | 87 |

[a][Monomer]/[catalyst] × conversion × $M_w$ (monomer).
[b]Determined by $^1$H-NMR in CDCl$_3$ by comparison of the methylene peak adjacent to the ester group of the monomer and the polymer.
[c][BnOH]$_0$ = 0.16M.
[d]Poor solubility of 3.
[e][BnOH]$_0$ = 0M.

To study the influence of the ring size of the lactone polymerized, a kinetic study with various ring sizes was performed. All polymerizations were done under the same conditions (100° C. under inert atmosphere) and the same catalyst:initiator:monomer ratio of 1:1:100 was applied. The results are summarized in Table 3 (in Table 3: [complex]≈15 mM, [lactone]$_0$≈15 mM, T=100° C.; β-BL=β-butyrolactone; γ-BL=γ-butyrolactone; VL=δ-valerolactone; CL=ε-caprolactone; DL=10-decalactone; UL=11-undecalactone; PDL=15-pentadecalactone; and HDL=16-hexadecalactone). Due to low solubility of the polymers based on larger lactones in THF, all SEC measurements were performed in 1,2,4-trichlorobenzene (TCB) at 160° C. The complex is virtually unreactive towards polymerization of β-butyrolactone (β-BL). The conversion did not exceed 3% and only low molecular weight products ($M_n$=850 g/mol) were obtained. As expected based on the thermodynamic stability of the 5-membered ring, no polymerization of γ-butyrolactone (γ-BL) was observed after 96 hours.

TABLE 3

| Monomer | Ring size | $k_{app}$ (min$^{-1}$) | $M_n$ calc. (g/mol)[a] | $M_n$ (g/mol)[b] | PDI | Conversion (%)[c] |
|---|---|---|---|---|---|---|
| β-BL | 4 | — | 8600 | 850 | 2.0 | 2.5 |
| γ-BL | 5 | — | 8600 | — | — | — |
| VL | 6 | 0.16 ± 0.01 | 10 000 | 10 000 | 2.1 | 96 |
| CL | 7 | 0.25 ± 0.03 | 11 400 | 13 000 | 2.3 | >99 |
| DL | 11 | (30 ± 4) · 10$^{-3}$ | 17 000 | 24 000 | 1.7 | 84 |
| UL | 12 | (10 ± 2) · 10$^{-3}$ | 18 400 | 27 000 | 1.6 | 91 |
| PDL | 16 | (30 ± 2) · 10$^{-3}$ | 24 000 | 36 000 | 1.6 | 90 |
| HDL | 17 | (40 ± 5) · 10$^{-3}$ | 25 600 | 40 000 | 1.8 | 98 |

[a][Monomer]/[catalyst] × conversion × $M_w$ (monomer).
[b]Measured by SEC in TCB at 160° C.
[c]Determined by $^1$H-NMR in CDCl$_3$ by comparison of the methylene peak adjacent to the ester group of the monomer (δ 4.14 ppm) and the polymer (δ 4.04 ppm).

What is claimed is:

1. A process for preparing a polyester, comprising
providing an optionally substituted lactone having a ring size of from 9 to 40 carbon atoms; and
subjecting said lactone to metal mediated ring-opening polymerization using as catalyst a compound according to general formula (I):

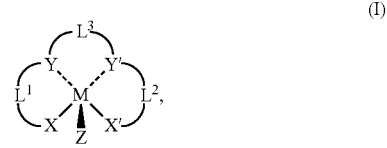

wherein
M is selected from the group consisting of Al, Ti, V, Cr, Mn and Co;
X and X' are independently a heteroatom,
Y and Y' are independently selected from the group consisting of O, N, S, P, C, Si, and B,
Z is selected from the group consisting of hydrogen, borohydrides, aluminum hydrides, carbyls, silyls, hydroxide, alkoxides, aryloxides, carboxylates, carbonates, carbamates, amidos, thiolates, phosphides, and halides;
L$^1$ and L$^2$ are independently an organic ligand linking X and Y together and linking X' and Y' together, respectively, and
L$^3$ is an optional organic ligand linking Y and Y' together.

2. The process according to claim 1, wherein the catalyst is a compound according to general formula (II):

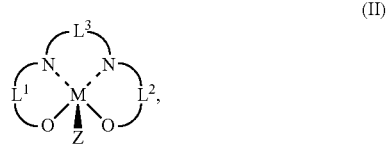

3. The process according to claim 1, wherein L$^1$ and L$^2$ are identical and are selected from group consisting of:

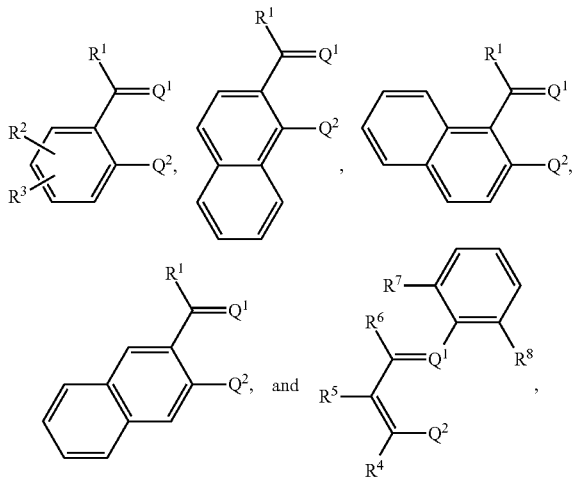

wherein $Q^1$ indicates the position of the moiety that links to Y and/or Y', and $Q^2$ indicates the position of the moiety that links to X and/or X', and wherein $R^1$ is selected from the group consisting of hydrogen, $C_{1-6}$ alkyl, or phenyl;

$R^2$ and $R^3$ are independently selected from the group consisting of hydrogen, $C_{1-10}$ alkyl, silyl, $C_{1-6}$ alkoxy, $C_{3-8}$ cycloalkyl, $C_{3-8}$ cycloalkoxy, aryl, aryloxy, a halide (F, Cl, Br, I), and a 5-or 6-membered heterocycle containing from 1 to 4 heteroatoms selected from oxygen, sulfur, nitrogen and phosphorous;

$R^4$, $R^5$, and $R^6$ are independently selected from the group consisting of hydrogen, $C_{1-10}$ alkyl, $C_{1-10}$ halogenated alkyl (such as fluorinated alkyl) silyl, $C_{1-6}$ alkoxy, $C_{3-8}$ cycloalkyl, $C_{3-8}$ cycloalkoxy, aryl, aryloxy, a halide (F, Cl, Br, I), and a 5- or 6-membered heterocycle containing from 1 to 4 heteroatoms selected from oxygen, sulfur, nitrogen and phosphorous, or $R^4$ and $R^5$ together form a 5- or 6-membered cyclic system optionally containing from 1 to 4 heteroatoms, or $R^5$ and $R^6$ together form a 5- or 6-membered cyclic system optionally containing from 1 to 4 heteroatoms; and $R^7$ and $R^8$ are independently selected from the group consisting of hydrogen, $C_{1-10}$ alkyl, silyl, $C_{1-6}$ alkoxy, $C_{3-8}$ cycloalkyl, $C_{3-8}$ cycloalkoxy, aryl, aryloxy, a halide (F, Cl, Br, I), and a 5- or 6-membered heterocycle.

4. The process according to claim 1, wherein the catalyst is a compound according to general formula (III):

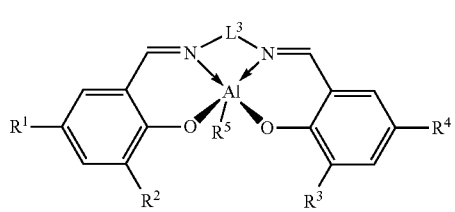

(III)

wherein
$R^{1-4}$ are independently selected from the group consisting of hydrogen, $C_{1-10}$ alkyl, silyl, $C_{1-6}$ alkoxy, $C_{3-8}$ cycloalkyl, $C_{3-8}$ cycloalkoxy, aryl, aryloxy, a halide (F, Cl, Br, I), and a 5- or 6-membered heterocycle containing from 1 to 4 heteroatoms selected from oxygen, sulfur, nitrogen, and phosphorous, and $R^5$ is selected from the group consisting of hydrogen (H), borohydrides ($BH_{4-x}R_x$, wherein x is an integer from 0-3 and R is carbyl, alkoxide), aluminum hydrides ($AlH_{4-x}R_x$, wherein x is an integer from 0-3 and R is carbyl alkoxide), carbyls (any hydrocarbon, $-CR_3$, $-Ar$ (aryl), $-CR=CR_2$, $-C\equiv CR$, wherein R is hydrogen, optionally substituted alkyl, optionally substituted aryl), silyls ($-SiR_3$, wherein R is hydrogen, optionally substituted alkyl, optionally substituted aryl), hydroxide ($-OH$), alkoxides ($-OR$, wherein R is optionally substituted alkyl), aryloxides ($-OAr$, carboxylates ($-OC(=O)R$, wherein R is hydrogen, optionally substituted alkyl, optionally substituted aryl), carbonates ($-OC(=O)OR$, wherein R is optionally substituted alkyl, optionally substituted aryl), carbamates ($-OC(=O)NR_2$, wherein R is optionally substituted alkyl, optionally substituted aryl), amidos ($-NR_2$, wherein R is hydrogen, optionally substituted alkyl, optionally substituted aryl), thiolates ($-SR$, wherein R is hydrogen, optionally substituted alkyl, optionally substituted aryl), phosphides ($-PR_2$, wherein R is hydrogen, optionally substituted alkyl, optionally substituted aryl), and halides (F, Cl, Br, I).

5. The process according to claim 4, wherein $L^3$ is selected from the group consisting of $-(CH_2)_2-$, 1,2-phenyl, and 1,2-cyclohexyl.

6. The process according to claim 4, wherein $R^{1-4}$ are independently selected from the group consisting of hydrogen, methyl, ethyl, propyl, isopropyl, butyl, n-butyl, i-butyl, t-butyl, n-pentyl, i-pentyl, neopentyl, n-hexyl, 2,2-dimethylbutane, 2-methylpentane, 3-methylpentane, 2,3-dimethylbutane, and cyclohexane.

7. The process according to claim 4, wherein at least two of $R^1$, $R^2$, $R^3$, and $R^4$ are identical.

8. The process according to claim 4, wherein $R^5$ is selected from the group consisting of an alkoxide ($-OR$, wherein R is optionally substituted alkyl, optionally substituted aryl), a carboxylate ($-OC(=O)R$, wherein R is optionally substituted alkyl, optionally substituted aryl), an amido ($-NR_2$, wherein R is optionally substituted alkyl, optionally substituted aryl), a thiolate ($-SR$, wherein R is optionally substituted alkyl, optionally substituted aryl), or borohydride ($BH_{4-x}R_x$, wherein x is an integer of from 1-3 and R is optionally substituted alkyl, (substituted) aryl).

9. The process according to claim 4, wherein
$R^1$, $R^2$, $R^3$, and $R^4$ are independently selected from the group consisting of hydrogen and t-butyl; and
$R^5$ is selected from the group consisting of methyl, ethyl, methoxy, ethoxy or benzoxy.

10. The process according to claim 1, wherein said lactone is selected from the group consisting of 9-nonalactone, 10-decalactone, 11-undecalactone, 12-dodecalactone, 13-tridecalactone, 14-tetradecalactone, 15-pentadecalactone, 16-hexadecalactone, the lactone of ricinoleic acid, 13-hexyloxacyclotridecan-2-one, 5-tetradecen-14-olide, 11-pentadecen-15-olide, 12-pentadecen-15-olide, 7-hexadecen-16-olide, 9-hexadecen-16-olide, 10-oxahexadecanolide, 11-oxahexadecanolide, 12-oxahexadecanolide, 12-oxahexadecen-16-olide, 6-decanolide, 6-dodecanolide, 8-hexadecanolide, 10-hexadecanolide, 12-hexadecanolide, and 6-decen-6-olide.

11. The process according to claim 1, wherein the molecular ratio between the lactone and the catalyst is in the range of 20:1-1000:1.

12. The process according to claim 1, wherein said ring opening polymerization is performed in the presence of an aliphatic or aromatic hydrocarbon solvent (such as heptane or toluene), a halogenated aliphatic or aromatic hydrocarbon solvent (such as dichloromethane, or bromobenzene), or an ether solvent (such as diethyl ether).

13. The process according to claim 1, wherein said catalyst is used in combination with an initiator.

14. The process according to claim 1, wherein said aliphatic polyester has a number average molecular weight of 10 000 g/mol or more as measured by size exclusion chromatography in 1,2,4-trichlorobenzene at 160° C. using polystyrene calibration.

15. The process according to claim 1, wherein the ring opening polymerization occurs with a polymerization rate of 0.01 min$^{-1}$ or more.

16. The process according to claim 1, wherein the ring opening polymerization is performed at a temperature in the range of from 70-180° C.

17. The process according to claim 1, for preparing a copolymer, wherein at least two different lactones as defined in claim 1 or a lactone as defined in claim 1 and a monomer different from a lactone as defined in claim 1 are subjected to the metal-mediated ring-opening polymerization.

18. The process according to claim 1, wherein X and X' are identical.

19. The process according to claim 1, wherein Y and Y' are identical.

20. The process according to claim 1, wherein $L^1$ and $L^2$ are identical.

* * * * *